US009326587B2

(12) United States Patent
Gronewoller et al.

(10) Patent No.: US 9,326,587 B2
(45) Date of Patent: May 3, 2016

(54) SPRING LOADED HOLSTER FOR ELECTRONIC DEVICE

(75) Inventors: Peter Gronewoller, Fort Collins, CO (US); Cameron Magness, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 185 days.

(21) Appl. No.: 13/466,320

(22) Filed: May 8, 2012

(65) Prior Publication Data

US 2013/0299533 A1 Nov. 14, 2013

(51) Int. Cl.
A45F 5/00 (2006.01)
A45F 5/02 (2006.01)
H04B 1/3888 (2015.01)

(52) U.S. Cl.
CPC .............. A45F 5/021 (2013.01); H04B 1/3888 (2013.01); A45F 2005/025 (2013.01); A45F 2200/0516 (2013.01)

(58) Field of Classification Search
CPC ............ A45F 5/021; A45F 2200/0516; A45F 2005/025; A45F 5/02; H04B 1/3888; A45C 11/00
USPC ................. 224/191, 195, 240, 666, 667, 269; 24/499, 305; 206/45.24; 455/90.3, 455/575.8
See application file for complete search history.

(56) References Cited

U.S. PATENT DOCUMENTS

| 4,420,078 | A | 12/1983 | Belt et al. |
| 4,842,174 | A | 6/1989 | Sheppard et al. |
| D359,616 | S | * 6/1995 | Ishibashi et al. ............... D3/218 |
| 5,537,678 | A | 7/1996 | King et al. |
| 5,555,157 | A | 9/1996 | Moller et al. |
| 5,573,164 | A | 11/1996 | Law |
| 6,029,871 | A | 2/2000 | Park |
| 6,176,401 | B1 | 1/2001 | Lim |
| 6,375,009 | B1 | 4/2002 | Lee |
| D457,308 | S | 5/2002 | Infanti |
| 6,491,194 | B2 * | 12/2002 | Marvin ......................... 224/483 |
| 6,752,299 | B2 | 6/2004 | Shetler et al. |
| D510,659 | S | 10/2005 | Goradesky |
| D548,960 | S | 8/2007 | Tages et al. |
| D550,450 | S | 9/2007 | Dong |
| 7,270,255 | B2 | 9/2007 | Badillo et al. |
| D564,753 | S | 3/2008 | Tages et al. |
| D574,819 | S | 8/2008 | Andre et al. |
| D575,056 | S | 8/2008 | Tan |
| D582,149 | S | 12/2008 | Tan |
| D594,224 | S | 6/2009 | Leung et al. |
| D594,225 | S | 6/2009 | Leung et al. |
| D596,393 | S | 7/2009 | Leung et al. |
| D597,089 | S | 7/2009 | Khan et al. |
| 7,562,774 | B2 | 7/2009 | Uehata |
| D603,603 | S | 11/2009 | Laine et al. |
| D606,751 | S | 12/2009 | Andre et al. |

(Continued)

*Primary Examiner* — Adam Waggenspack
*Assistant Examiner* — Matthew Theis

(57) ABSTRACT

A holster for an electronic device may have a pair of flexible hollow cushions that may hold the device in the holster. The cushions may be flexible enough to allow the device to be held in the holster both with and without a protective cover over the device. The cushions may have a hollow portion that collapses when compressed during insertion of the device. The cushion material may be a molded silicone that may have a nonslip surface finish. In some embodiments, the cushion may protrude through a bottom surface of the holster to provide a nonslip foot when the holster is used as a stand support for the device.

19 Claims, 5 Drawing Sheets

(56) References Cited

U.S. PATENT DOCUMENTS

| | | |
|---|---|---|
| 8,070,026 B2 | 12/2011 | Wadsworth et al. |
| 2001/0040109 A1 | 11/2001 | Yaski et al. |
| 2003/0103624 A1 | 6/2003 | Hu |
| 2004/0099702 A1 | 5/2004 | Conner |
| 2004/0112143 A1 | 6/2004 | Richardson |
| 2004/0262350 A1 | 12/2004 | Batchelor |
| 2005/0189913 A1 | 9/2005 | Vitanov et al. |
| 2006/0116183 A1 | 6/2006 | Infanti |
| 2006/0231713 A1 | 10/2006 | Crain et al. |
| 2007/0138041 A1* | 6/2007 | Welsh .......................... 206/349 |
| 2007/0261978 A1 | 11/2007 | Sanderson |
| 2008/0156836 A1 | 7/2008 | Wadsworth et al. |
| 2010/0006468 A1* | 1/2010 | Lin ............................... 206/522 |
| 2010/0203931 A1* | 8/2010 | Hynecek et al. ............ 455/575.8 |
| 2011/0000945 A1* | 1/2011 | Mongan ................... A45F 5/02 224/581 |
| 2011/0073608 A1* | 3/2011 | Richardson ............ A45C 11/00 220/737 |
| 2011/0155774 A1* | 6/2011 | Gandhi et al. ................ 224/197 |
| 2013/0118932 A1* | 5/2013 | Green et al. .................. 206/320 |

\* cited by examiner

SPRING LOADED HOLSTER FOR ELECTRONIC DEVICE

BACKGROUND

Portable electronic devices such as cellular telephones and music players are ubiquitous. Users often like to carry their devices in holsters that may be mounted on a belt or may place the devices in holders on a bicycle, car, or desk.

SUMMARY

A holster for an electronic device may have a pair of flexible hollow cushions that may hold the device in the holster. The cushions may be flexible enough to allow the device to be held in the holster both with and without a protective cover over the device. The cushions may have a hollow portion that collapses when compressed during insertion of the device. The cushion material may be a molded silicone that may have a nonslip surface finish. In some embodiments, the cushion may protrude through a bottom surface of the holster to provide a nonslip foot when the holster is used as a stand support for the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A holster for an electronic device may have one or more collapsible cushions that flex during installation and removal of the device from the holster. The cushions may have a large amount of flex such that the holster may hold multiple sizes of devices or devices with or without additional protective cases.

The cushions may have a nonslip surface that helps hold the device securely while in the device. In many embodiments, the cushions may be molded of thermoplastic elastomer, silicone, or other moldable material that may or may not contain silicone. Some embodiments may have the cushions extend outside of the holster cavity such that the portion of the cushions outside the cavity may act as nonslip feet when the holster is used in a stand position.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

Figure 1:
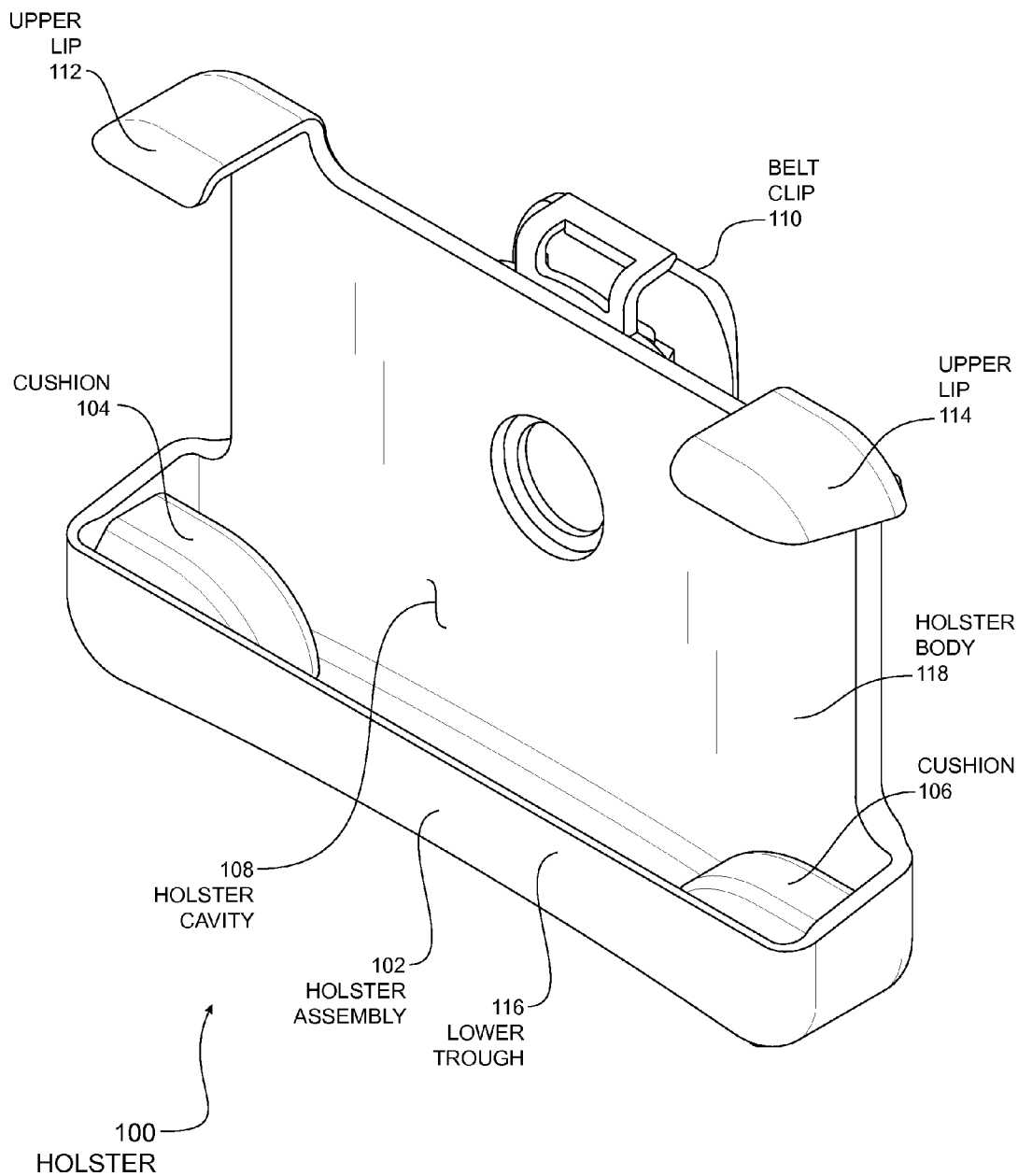
FIG. 1 is a perspective illustration of an embodiment showing a holster.

FIG. 1 is a perspective view of an embodiment 100 showing a holster assembly 102. FIG. 1 is not to scale.

The holster assembly 102 is composed of a holster body 118, cushions 104 and 106, and a belt clip 110.

The holster body 118 may be a rigid component that has a cavity 108 into which a device may be stored. The device may be held on top by upper lips 112 and 114, and held on the bottom by a lower trough 116.

Within the lower trough 116 may be two cushions 104 and 106. The cushions may conform or deflect to provide a spring-like effect to hold a device in the holster. The cushions may be hollow on the inside and may be made from a silicone or thermoplastic elastomer material.

Figure 2:
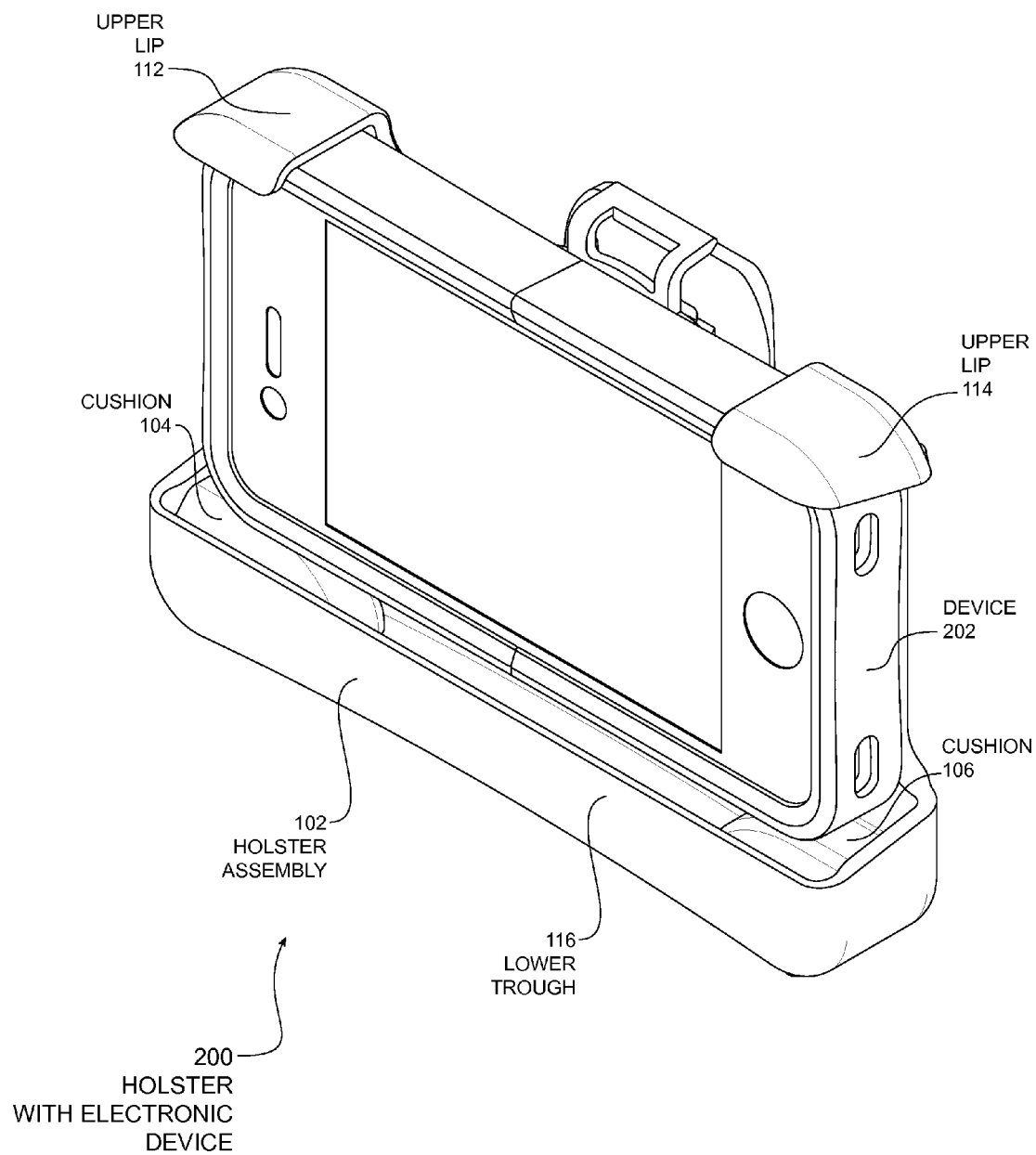
FIG. 2 is a perspective illustration of an embodiment showing the holster of FIG. 1 with an electronic device installed.

FIG. 2 is a perspective view of an embodiment 200 showing the holster assembly 102 with a device 202. FIG. 2 is not to scale.

In embodiment 200, a device 202 is shown installed into the holster assembly 102. The cushions 104 and 106 are shown.

The device 202 may be a cellular telephone, music player, camera, or other device.

The device 202 may be installed by first placing the device 202 against the cushions 104 and 106, then pressing down to deflect the cushions 104 and 106 until the top of the device 202 fits underneath the upper lips 112 and 114. The device may then be rotated into the holster cavity and released, allowing the cushions 104 and 106 to raise the device 202 against the upper lips 112 and 114.

When the device 202 is in the holster cavity as shown in embodiment 200, the spring force of the cushions 104 and 106 may force the device 202 against the upper lips 112 and 114, holding the device 202 in the holster in a secure fashion. The upper lips 112 and 114 may have a lip that contains the device 202 from falling forward (as viewed in the figure). Further, the device 202 may be oriented in the lower trough 116 such that the device 202 is within the lower trough. In such an orientation, the lower trough may contain the device 202 within the holster, as the lower edge of the device 202 may be lower than the upper edge of the lower trough.

Because the cushions 104 and 106 may have a large amount of deflection while still providing a return spring force, the holster assembly 102 may be able to accommodate several different sized devices. Some embodiments may be able to securely hold a device 202 both with and without a protective case assembled onto the device 202, or with a variety of protective cases.

The holster assembly 102 is shown in the position where the upper lips 112 and 114 are at the top of the illustration. The holster assembly 102 may hold the device 202 in any orientation, including upside down from the illustration, rotated ninety degrees from the illustration, or any other configuration. In some embodiments, the holster may be oriented such that the belt clip is facing upwards, such as if the belt clip 110 were attached to a sun visor in a user's car, for example.

Figure 3:
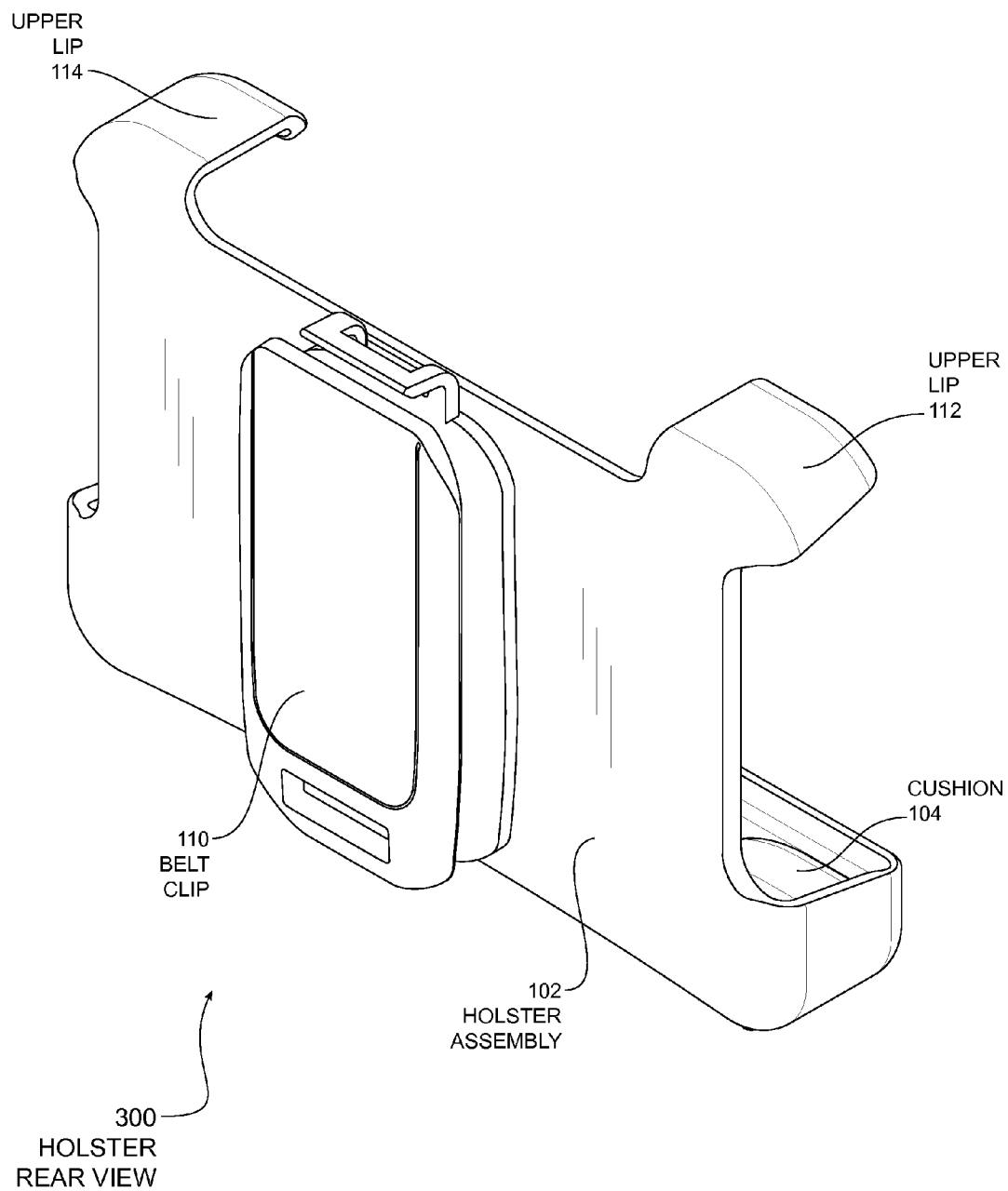
FIG. 3 is a perspective illustration of an embodiment showing the holster of FIG. 1 from the rear.

FIG. 3 is a perspective view of an embodiment 300 showing the holster assembly 102 from the rear.

The holster assembly 102 is illustrated showing the belt clip 110, upper lips 112 and 114, and the cushion 104. The belt clip 110 may be rotatable 360 degrees with respect to the holster body, allowing the user to configure the belt clip to mount on a variety of applications while holding the holster in a variety of orientations.

Figure 4A:
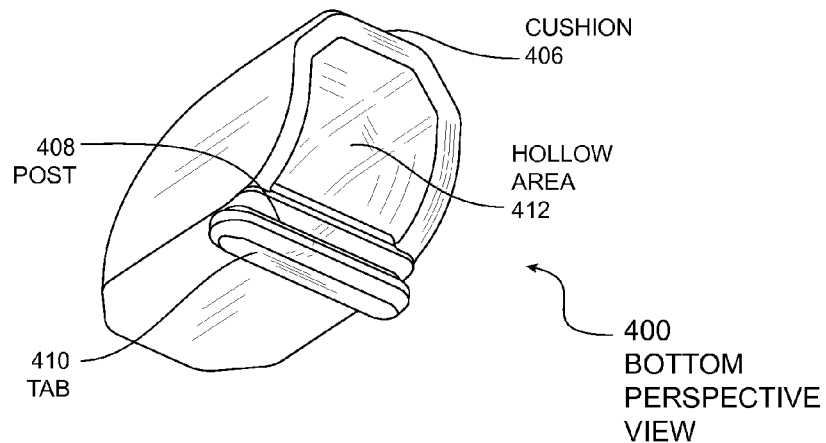
FIG. 4A is a lower perspective view of an embodiment showing a cushion.
Figure 4B:
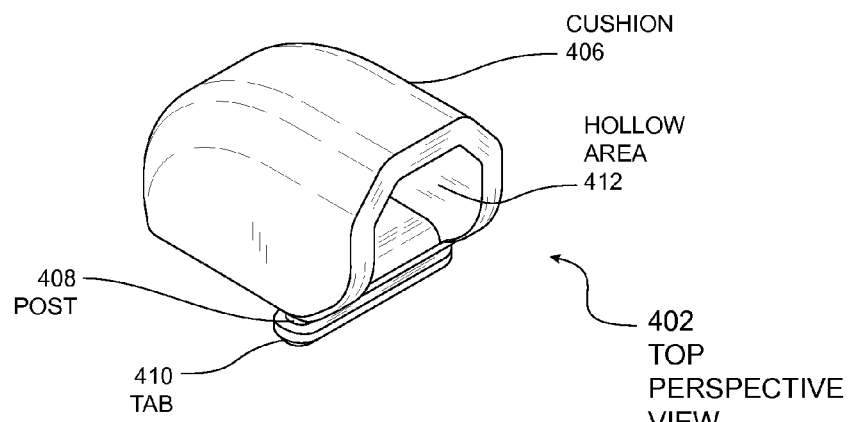
FIG. 4B is an upper perspective view of an embodiment showing a cushion.
Figure 4C:
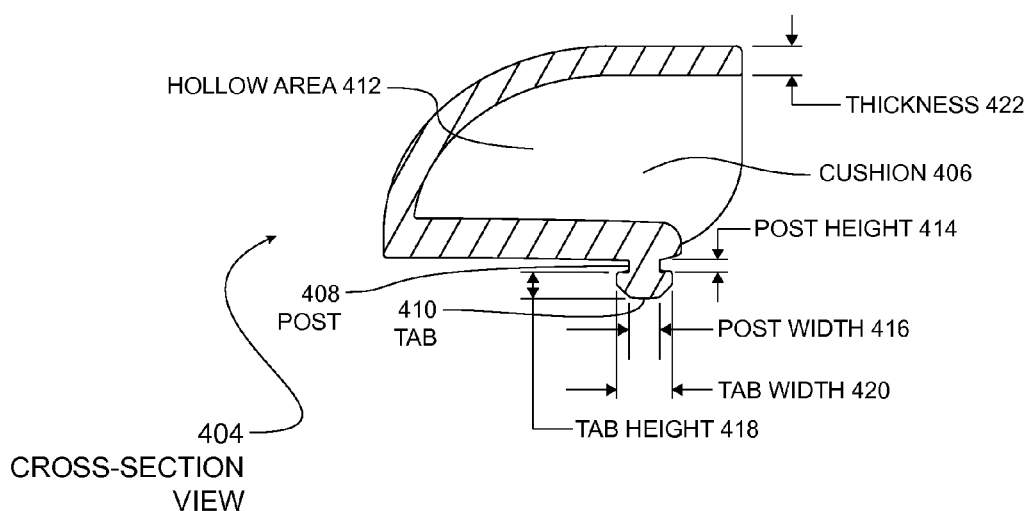
FIG. 4C is a cross-sectional view of an embodiment showing a cushion.

FIGS. 4A, 4B, and 4C illustrate three views of a typical cushion. FIGS. 4A, 4B, and 4C are not to scale.

FIG. 4A shows an embodiment 400 of a cushion from a lower perspective view.

FIG. 4B shows an embodiment 402 of a cushion from an upper perspective view.

FIG. 4C shows an embodiment 404 of a cross-sectional view of a cushion.

The cushion 406 may be a hollow component that is manufactured from a flexible material. In many embodiments, the cushion 406 may be molded from a thermoplastic elastomer, silicone, or some other flexible material.

The cushion 406 may have a hollow area 412. The hollow area 412 may collapse when crushed, but may return to the normal position, thus acting as a spring. The hollow area 412 may allow the cushion 406 to collapse to approximately 10-20% of its overall height.

The cushion 406 may have a post 408 and tab 410 that may be used to attach the cushion 406 to a holster. The post 408 and tab 410 may be inserted into an opening or hole in the holster that corresponds with the shape of the post 408. The tab 410 may protrude fully or partially from the hole in the holster.

The thickness 422 may be the approximate thickness of the top and walls of the cushion 406. The thickness 422 may be 0.010 in, 0.020 in, 0.050 in, 0.070 in, 0.100 in, or larger.

The post 408 may have dimensions of a height 414 and width 416. In some embodiments, the width 416 may be the same as the thickness 422. The width 416 may be various sizes, including 0.010 in, 0.020 in, 0.050 in, 0.070 in, 0.100 in, or larger, depending on the embodiment. Similarly, the height 414 may be various sizes, including 0.010 in, 0.020 in, 0.050 in, 0.070 in, 0.100 in, or larger, depending on the embodiment. In many embodiments, the height 414 may be the same thickness as the thickness of a holster body into which the cushion 406 may be attached.

The tab 410 may have dimensions of a height 418 and width 420. The height 418 may be selected to provide a nonslip foot for a holster when the holster is placed in a stand position. The height 418 may be the same as thickness 422. The height 418 may be various sizes, including 0.010 in, 0.020 in, 0.050 in, 0.070 in, 0.100 in, or larger, depending on the embodiment.

The tab width 420 may be larger than the post width 416 and may serve as a mechanism to keep the cushion 406 attached to the holster. The tab width 420 may be various sizes, including 0.010 in, 0.020 in, 0.050 in, 0.070 in, 0.100 in, or larger, depending on the embodiment.

Figure 5:
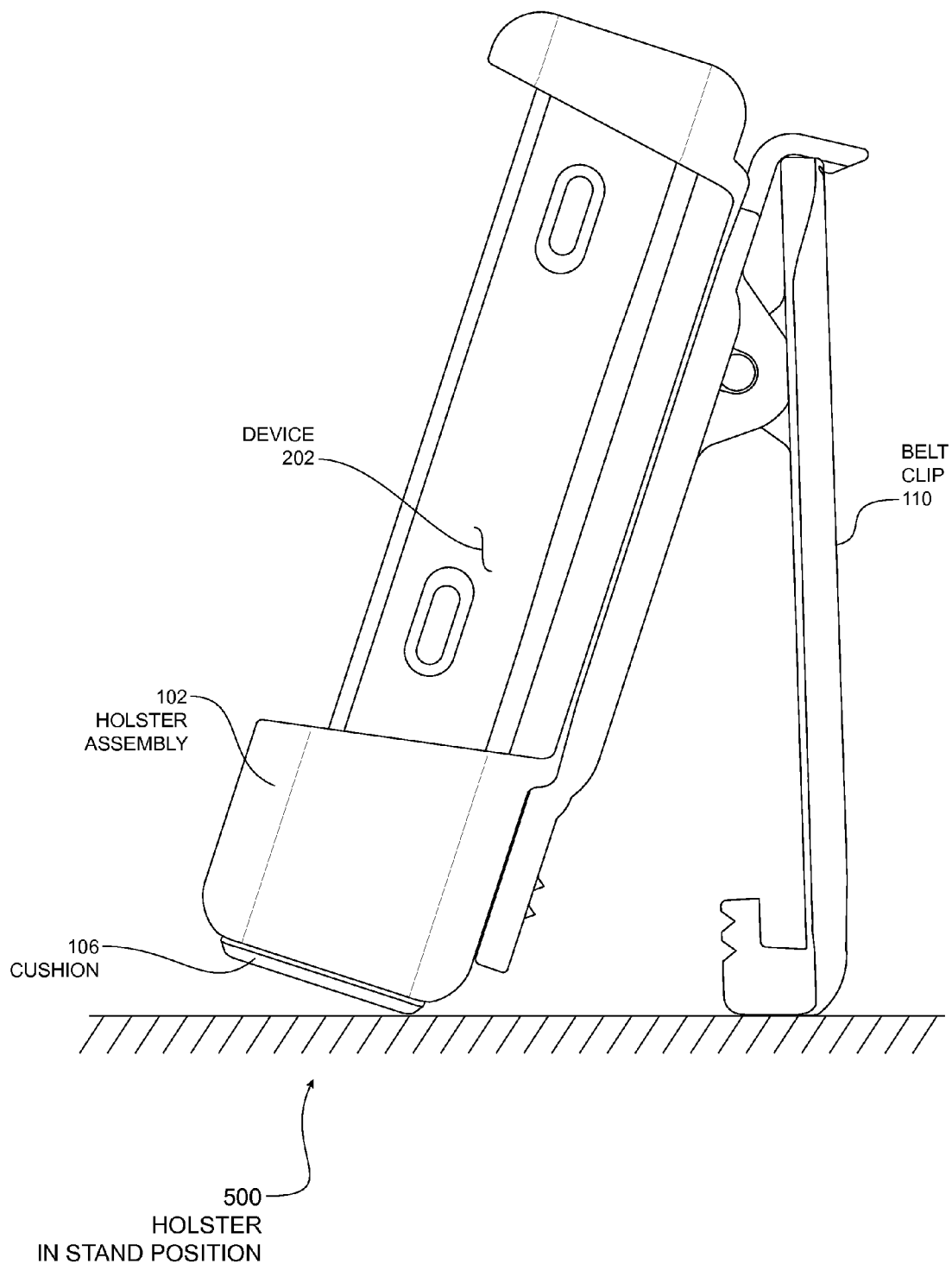
FIG. 5 is a side view of an embodiment showing a holster with a device in a stand position.

FIG. 5 is a side view of an embodiment 500 showing the holster assembly 102 in a stand position. FIG. 5 is not to scale.

The holster assembly 102 is shown with a belt clip 110 in an open position and with the device 202 installed into the holster assembly 102. The cushion 106 protrudes from the holster assembly 102 and may serve as a nonslip foot for the assembly.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A holster for retaining an electronic device, the electronic device having a proximal side and a distal side separated from one another by first and second opposed sides, the first and second opposed sides being longer than the proximal and distal sides, together the proximal, distal, and opposed sides defining a front surface and a back surface of the electronic device, the front surface including a touch screen interface, the holster comprising:

a rigid holster body including an upper part and a lower part, the upper part having a peripheral portion;

a plurality of upper lips extending forward from the peripheral portion of the upper part of the rigid holster body, each upper lip configured for receiving a corner of the electronic device, each upper lip having a retaining lip configured to extend over at least a portion of the front surface or the back surface of the electronic device, each retaining lip configured to prevent the electronic device from falling away from the upper part of the rigid holster body after being inserted into the holster;

a lower trough extending forward from the lower part of the rigid holster body opposite the plurality of upper lips, the lower trough defined by a front wall, a first side wall, and a second side wall, the trough and the lower part of the rigid holster body forming a container for containing the entire first or second opposed side of the electronic device; and a plurality of flexible cushions in the lower trough, each flexible cushion defined by a plurality of side members and an open side area, the side members and the open side area defining a hollow portion of the flexible cushion that is sized and adapted to allow each flexible cushion to collapse when receiving one of the first and second opposed sides of the electronic device, each of the flexible cushions oriented in the lower trough such that the open side area of each flexible cushion faces one or more of the walls of the lower trough and such that the installed electronic device does not contact or seal the open side areas of the flexible cushions, wherein each flexible cushion is adapted to apply spring pressure to urge the other of the first and second opposed sides of the electronic device against the upper lips when the one of the first and second opposed sides of the electronic device is contained in the lower trough.

2. The holster in accordance with claim 1 wherein the flexible cushions have a height and wherein at least one of the flexible cushion is collapsible to 20% or less of the height.

3. A holster for retaining an electronic device, the electronic device having a proximal side and a distal side separated from one another by first and second opposed sides, the first and second opposed sides being longer than the proximal and distal sides, together the proximal, distal, and opposed sides defining a front surface and a back surface of the electronic device, the front surface including a touch screen interface, the holster comprising:

a rigid holster body including an upper part and a lower part, the upper part having a peripheral portion;

an upper lip extending forward from the peripheral portion of the upper part of the rigid holster body, the upper lip configured for receiving a portion of one or more of the proximal side, the distal side, and one of the opposed sides of the electronic device, the upper lip having a retaining lip configured to extend around the first or second side of the electronic device and contact at least a portion of the front surface or the back surface of the electronic device, thereby preventing the electronic device from falling away from the upper part of the rigid holster body after being inserted into the holster;

a lower trough extending forward from the lower part of the rigid holster body opposite the upper lip, the lower trough defined by a front wall, a first side wall, and a second side wall, the trough and the lower part of the rigid holster body forming a container for containing another of the opposed sides of the electronic device; and a flexible cushion in the lower trough, the flexible cushion defined by a plurality of side members and an open side area, the side members and the open side area defining a hollow portion of the flexible cushion that is sized and adapted to allow the flexible cushion to collapse when receiving the electronic device, wherein the open side area of the flexible cushion faces one or more of the walls of the lower trough such that the installed electronic device does not contact the open side area of the flexible cushion, wherein each flexible cushion is adapted to apply spring pressure to urge one of the opposed sides of the electronic device against the upper lip when the electronic device is contained in the lower trough.

4. The holster in accordance with claim 3, wherein the flexible cushion comprises two flexible cushions positioned at opposing ends of the lower trough.

5. The holster in accordance with claim 3, wherein the upper lip further comprises:
   a first upper lip extending forward from a first peripheral portion of an upper portion of the rigid holster body; and
   a second upper lip extending forward from a second peripheral portion of the upper portion of the rigid holster body.

6. The holster in accordance with claim 3, further comprising a clip connected with a rear portion of the rigid holster body.

7. The holster in accordance with claim 6, wherein the clip is biased to a closed position by a spring, and wherein the clip can be configured to an open position by overcoming a bias of the spring.

8. The holster in accordance with claim 7, wherein the clip further comprises a detent to maintain the clip in the open position.

9. The holster in accordance with claim 3 wherein the flexible cushion has a height and wherein the flexible cushion is collapsible to 20% or less of the height.

10. A holster for an electronic device, the electronic device having a first portion, a second portion, and a third portion, the holster comprising:
    a holster body including an upper part and a lower part, the upper part having a first and a second peripheral portion;
    a first upper lip extending forward from the first peripheral portion of the upper part of the holster body;
    a second upper lip extending forward from the second peripheral portion of the upper part of the holster body;
    a trough extending forward from the lower part of the holster body opposite the upper part of the holster body, the trough defined by a front wall, a first side wall, a second side wall, and a portion of the holster body, the trough and the lower part of the holster body providing a container for entirely containing the first portion of the electronic device; and
    a flexible cushion in the trough, the flexible cushion defined by a plurality of side members, a top member, and an open side area, the side members, the top member, and the open side area defining a hollow portion of the flexible cushion that is sized and adapted to allow the flexible cushion to collapse in response to receiving the electronic device and to apply spring pressure to urge the second and third portion of the electronic device against the first upper lip and the second upper lip, respectively, when the first portion of the electronic device is contained in trough, wherein the open side area of the flexible cushion faces one or more of the walls of the trough such that the installed electronic device does not contact the open side area of the flexible cushion.

11. The holster in accordance with claim 10, wherein the flexible cushion comprises two flexible cushions positioned at opposing ends of the trough.

12. The holster in accordance with claim 10, further comprising a clip connected with a rear portion of the holster body.

13. The holster in accordance with claim 12, wherein the clip is biased to a closed position by a spring, and wherein the clip can be configured to an open position by overcoming a bias of the spring.

14. The holster in accordance with claim 13, wherein the clip further comprises a detent to maintain the clip in the open position.

15. The holster in accordance with claim 10 wherein the flexible cushion has a height and wherein the flexible cushion is collapsible to 20% or less of the height.

16. A holster for an electronic device, the holster comprising:
    a holster body;
    a first upper lip extending forward from a first peripheral portion of an upper portion of the holster body;
    a second upper lip extending forward from a second peripheral portion of the upper portion of the holster body;
    a lower trough extending forward from a lower portion of the holster body opposite the upper portion of the holster body, the lower trough for receiving an entire first portion of the electronic device, the lower trough defined by a front wall, a first side wall, a second side wall, and a portion of the holster body; and
    a pair of flexible cushions at opposite ends of the lower trough, each of the pair of flexible cushions having an open side and a hollow portion and being sized and adapted to allow the flexible cushion to collapse to receive electronic devices of a variety of sizes into the holster, each hollow portion defined by a plurality of side members, a top member, and an open side area, the hollow portion configured to apply spring pressure to urge the electronic device against the first upper lip and second upper lip, respectively, when the electronic device is received in the lower trough, wherein the flexible cushions are positioned such that the received electronic device does not contact the open side areas of the flexible cushions.

17. The holster in accordance with claim 16, further comprising a clip connected with a rear portion of the holster body.

18. The holster in accordance with claim 17, wherein the clip is biased to a closed position by a spring, and wherein the clip can be provided in an open position by overcoming a bias of the spring.

19. The holster in accordance with claim 18, wherein the clip further comprises a detent to maintain the clip in the open position.

* * * * *